United States Patent
Shin et al.

(10) Patent No.: US 10,498,285 B2
(45) Date of Patent: Dec. 3, 2019

(54) TEMPERATURE CALCULATION SYSTEM OF MOTOR USING THERMAL EQUIVALENT CIRCUIT

(71) Applicants: Hyundai Motor Company, Seoul (KR); Kia Motors Corporation, Seoul (KR)

(72) Inventors: YoungJin Shin, Changwon-si (KR); Sanghoon Moon, Yongin-si (KR); WoongChan Chae, Gwangmyeong-si (KR); Hyoungjun Cho, Suwon-si (KR); Jung Shik Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 313 days.

(21) Appl. No.: 15/617,799

(22) Filed: Jun. 8, 2017

(65) Prior Publication Data
US 2018/0167018 A1    Jun. 14, 2018

(30) Foreign Application Priority Data
Dec. 12, 2016  (KR) .......................... 10-2016-0168905

(51) Int. Cl.
| G01K 1/00 | (2006.01) |
| G01K 13/00 | (2006.01) |
| G01K 7/00 | (2006.01) |
| H02P 29/64 | (2016.01) |
| G01K 13/08 | (2006.01) |
| G01K 7/16 | (2006.01) |

(52) U.S. Cl.
CPC ............... *H02P 29/64* (2016.02); *G01K 7/16* (2013.01); *G01K 13/08* (2013.01)

(58) Field of Classification Search
USPC ......................... 374/152, 144, 141, 208, 163
See application file for complete search history.

(56) References Cited

U.S. PATENT DOCUMENTS

| 8,487,575 B2 | 7/2013 | Yeh et al. |
| 2016/0134225 A1 | 5/2016 | Ikitake et al. |
| 2019/0020299 A1* | 1/2019 | Lan .......................... B60L 15/20 |

FOREIGN PATENT DOCUMENTS

| JP | 5868556 B2 | 2/2016 |
| KR | 1020060008373 A | 1/2006 |
| KR | 101394548 B1 | 5/2014 |

* cited by examiner

*Primary Examiner* — Mirellys Jagan
(74) *Attorney, Agent, or Firm* — Slater Matsil, LLP

(57) ABSTRACT

A temperature calculation system includes a yoke disposed along an inner circumference, first and second teeth arranged on an inner circumference surface of the yoke while having an interval set in a circumference direction, and a coil member formed between the first and second teeth and including a plurality of coils, forms a thermal equivalent circuit of the coil member, and calculates a temperature of a set portion of the coil member. An outer circumference surface temperature and an inner circumference surface temperature of the coil member are calculated by using radial conduction resistance using a temperature of an inner one side of the coil member. An average temperature of the coil member is calculated by using compensation resistance from the temperature of the inner one side of the coil member, thermal capacity of the coil member, and a heating amount of the coils formed in the coil member.

20 Claims, 9 Drawing Sheets

FIG. 5

| CLASSIFICATION | THERMAL SYSTEM | ELECTRIC SYSTEM |
|---|---|---|
| Potential | $\Delta T$ | V |
| Flow | Q' | I |
| Resistance | R | R |
| Capacitance | C | C |
| Law | $Q' = \Delta T/R$ | $I = V/R$ |

TEMPERATURE CALCULATION SYSTEM OF MOTOR USING THERMAL EQUIVALENT CIRCUIT

CROSS-REFERENCE TO RELATED APPLICATIONS

This application claims priority to and the benefit of Korean Patent Application No. 10-2016-0168905 filed in the Korean Intellectual Property Office on Dec. 12, 2016, the entire contents of which are incorporated herein by reference.

TECHNICAL FIELD

The present invention relates to a temperature calculation system of a motor using a thermal equivalent circuit.

BACKGROUND

Among electronic devices, an interior permanent magnet synchronous motor (IPMSM) will be described by way of example, and may be referred to as a motor.

Since the IPMSM simultaneously has a magnetic torque component caused by a permanent magnet and an armature current and a reluctance torque component caused by a d-q axis inductance difference, it may obtain high torque per a unit volume.

However, according to drive characteristics of the IPMSM, excessive iron loss occurs in high speed region, and since a large input current is required to control a high output, copper loss occurs. Such occurrence of a thermal source causes a disadvantage of raising a temperature of the motor, which adversely affect not only a lifespan of the motor but also characteristics of a rare earth based permanent magnet having demagnetization characteristics at a high temperature.

Accordingly, when the motor is designed, it is nature that a consideration on temperature characteristics of the motor should be first applied.

To this end, various thermal analysis technologies of the motor, such as thermal equivalent circuit network method utilizing a lumped parameter method, a distributed parameter method using a finite element method and a finite difference method, and the like have been suggested.

Among these, in order to calculate thermal performance of the motor, the finite element method and the finite difference method are generally used.

However, the thermal analysis using the finite element method and the finite difference method may take a long time to divide the elements and calculate a matrix to analyze a complex region.

That is, there is a problem that it is difficult to apply to an entire region of a shape of the motor.

For this reason, a method is required that a calculation on a thermal analysis is relatively simple and an entire temperature distribution at various portions of the motor may be easily confirmed, as compared to the distributed parameter method.

The above information disclosed in this Background section is only for enhancement of understanding of the background of the invention and therefore it may contain information that does not form the prior art that is already known in this country to a person of ordinary skill in the art.

The Korean Patent Laid-Open Publication No. 10-2006-0008373 and Korean Patent Publication No. 10-1394548 are related to this application.

SUMMARY

The present invention has been made in an effort to provide a temperature calculation system of a motor using a thermal equivalent circuit configuring an optimal element in consideration of convection and conduction phenomena having advantages of shortening a thermal analysis time and being also applied to various analysis conditions, as compared to a conventional thermal analysis method.

An exemplary embodiment of the present invention provides a temperature calculation system of a motor using a thermal equivalent circuit including: a yoke disposed along an inner circumference, first and second teeth arranged on an inner circumference surface of the yoke while having an interval set in a circumference direction, and a coil member formed between the first and second teeth and including a plurality of coils, forms a thermal equivalent circuit of the coil member, and calculates a temperature of a set portion of the coil member, wherein an outer circumference surface temperature and an inner circumference surface temperature of the coil member are calculated by using radial conduction resistance using a temperature Tc of an inner one side of the coil member, an average temperature of the coil member is calculated by using compensation resistance from the temperature of the inner one side of the coil member, thermal capacity of the coil member, and a heating amount of the coils formed in the coil member, and a temperature of an end surface is calculated by using axial conduction resistance in the average temperature.

The coil member may include a plurality of coils, and an insulating paper interposed between the coils and the first and second teeth.

The coil member may include coating members formed on outer circumference surfaces of the coils, and air gaps formed between the coils.

A temperature of the first teeth side in the coil member may be calculated from the average temperature by using coil conduction resistances corresponding to the coils and insulating paper conduction resistance corresponding to the insulating paper.

The coil conduction resistances and the insulating paper conduction resistance may be preset values.

The radial conduction resistance, the compensation resistance, the thermal capacity, the heating amount of the coil, and the axial conduction resistance may be preset values.

The heating amount of the coil may be calculated by power input to the motor.

When it is determined that each calculated temperature is each set value or more, or is greater than each set value, power input to the motor may be adjusted to be decreased, or an emergency signal may be generated.

According to an embodiment of the present invention, it is possible to calculate the temperature of the motor within a relative short time by providing the temperature calculation method of the motor calculating the temperature of each component according to input power according to conduction and convection characteristics using the thermal equivalent circuit formed according to the components, when the thermal analysis of the electronic device such as the motor is performed.

That is, it is possible to shorten the calculation time by analyzing the thermal system of the motor on the same principle as the electric system, and it is possible to prevent thermal failure of the motor in advance and improve durability thereof by deriving the temperature of each element of the motor in almost real time.

As well, according to the present invention, it is possible to accurately and quickly calculate the temperature of the set position of the coil member in consideration of the conduction and convection phenomena.

BRIEF DESCRIPTION OF THE DRAWINGS

FIG. 5 is a Table comparing a thermal system and an electric system according to an exemplary embodiment of the present invention.

DETAILED DESCRIPTION OF ILLUSTRATIVE EMBODIMENTS

Figure 1:
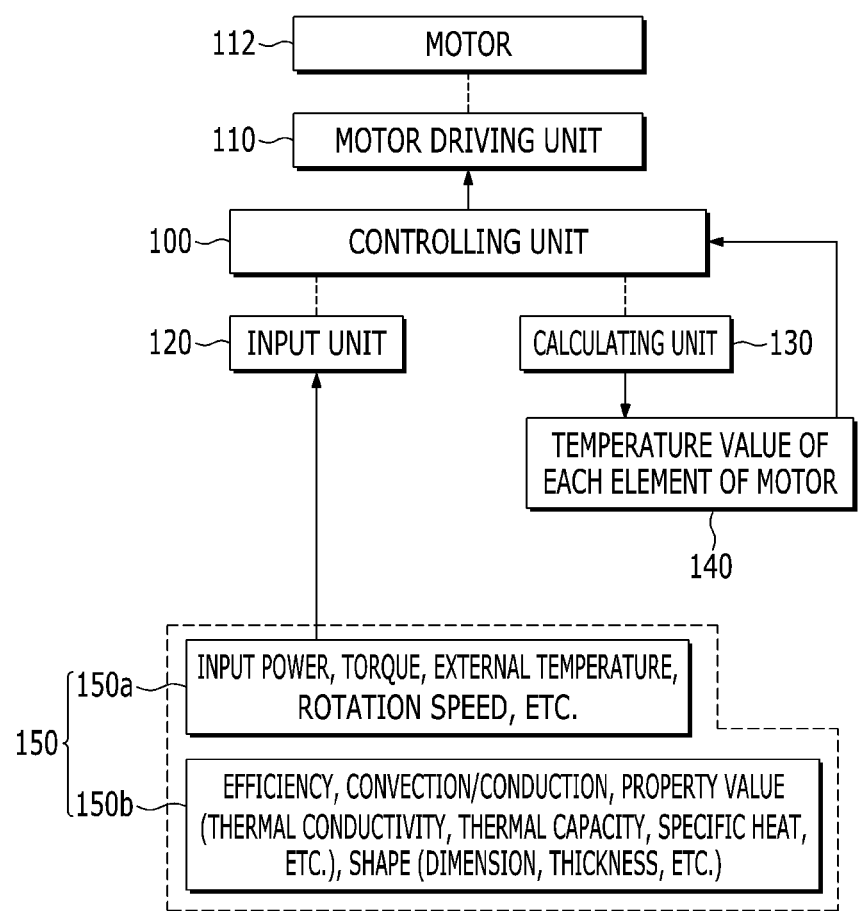
FIG. 1 is a schematic block diagram of a temperature calculation system of a motor using a thermal equivalent circuit according to an exemplary embodiment of the present invention.

The present invention relates to a temperature calculation system of a motor using a thermal equivalent circuit that may calculate a temperature of each of the components according to a driving condition of a driving motor used for a vehicle and may protect the components according to a temperature of the driving motor.

Hereinafter, exemplary embodiments of the present invention will be described in detail with reference to the accompanying drawings.

Since sizes and thicknesses of the respective components shown in the drawings are arbitrarily shown for the convenience of explanation, the present invention is not necessarily limited to those shown in the drawings, and thicknesses of several parts and regions are exaggerated for clarity.

The drawings and description are to be regarded as illustrative in nature and not restrictive. Like reference numerals designate like elements throughout the specification.

In the following detailed description, classifying names of the configurations into first, second, and the like, is to classify the configurations because the configurations have the same name, and the present invention is not necessarily limited to the above-mentioned order in the following detailed description.

FIG. 1 is a schematic block diagram of a temperature calculation system of a motor using a thermal equivalent circuit according to an exemplary embodiment of the present invention.

Referring to FIG. 1, a temperature calculation system of a motor includes a motor 112, a driving unit 110 of the motor, a controlling unit 100, a input unit 120, and a calculating unit 130, and an input value 150 input to the input unit 120 includes a real time input value 150a and a set input value 150b which is preset. In addition, a temperature value 140 calculated by the calculating unit 130 includes a temperature value of each element of the motor.

The real time input value 150a includes input power, torque, external temperature, rotation speed, and the like, and the set input value 150b includes property values such as efficiency, convection/conduction characteristics, thermal conductivity, thermal capacity, and specific heat, and a shape including a thickness and a dimension.

The controlling unit 100 may calculate a temperature of the heating part among the elements of the motor using input data and calculate a temperature of each of the elements using a convection thermal equivalent circuit or a conduction thermal equivalent circuit between the elements, and when it is determined that the calculated temperature exceeds a set value, the controlling unit 100 may control the driving unit 110 of the motor to control the input power or the rotation speed input to the motor 112.

Further, when it is determined that the calculated temperature exceeds the set value, the controlling unit 100 may generate an overheat signal, and may control a display unit (not shown) displaying an overheated state so that a user may confirm the overheated state.

The controlling unit 100 may be implemented by one or more microprocessors operated by a set program, and the set program may include a series of instructions for performing a method according to an exemplary embodiment of the present invention to be described below.

Figure 2:
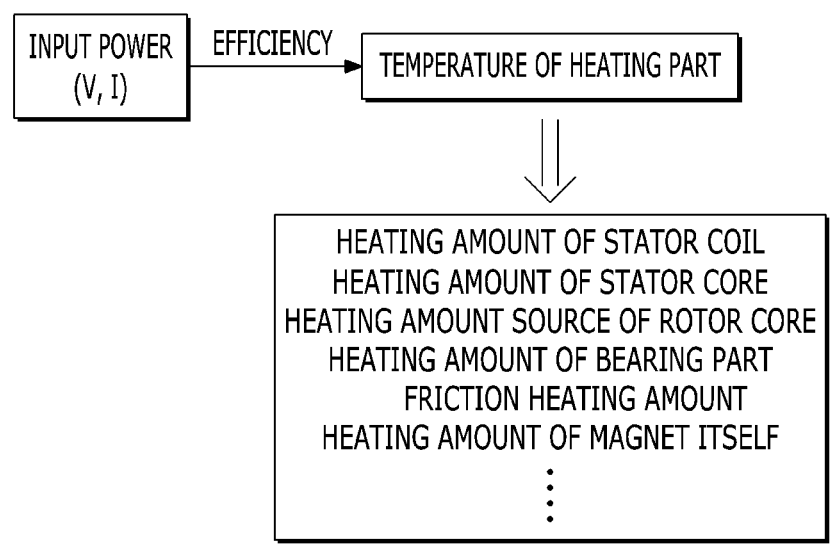
FIG. 2 is a schematic block diagram illustrating elements of a heating part according to input power and efficiency according to an exemplary embodiment of the present invention.

FIG. 2 is a schematic block diagram illustrating elements of a heating part according to input power and efficiency according to an exemplary embodiment of the present invention.

Referring to FIG. 2, the input power is input in real time, the temperature of the heating part is calculated according to the efficiency of the motor 112. The heating part may include a coil of a stator, a core of the stator, a core of a rotor, a bearing part, a friction part, and a magnet of the rotor.

Further, according to an exemplary embodiment of the present invention, the rotation speed of the motor 112 together with the input power may be input, and a temperature of the friction part and a temperature of the bearing part may be calculated by the rotation speed of the motor.

Figure 3:
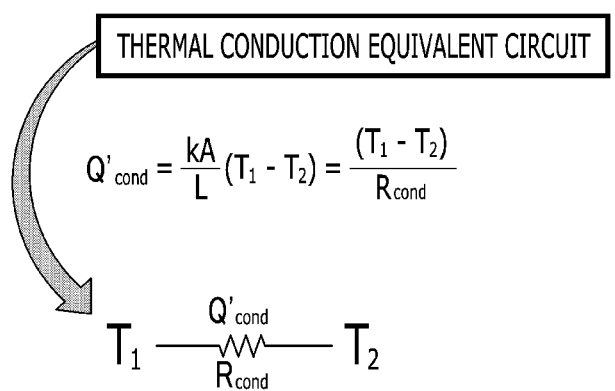
FIG. 3 is an equation illustrating a conduction thermal equivalent circuit according to an exemplary embodiment of the present invention.

FIG. 3 is an equation illustrating a conduction thermal equivalent circuit according to an exemplary embodiment of the present invention.

Referring to FIG. 3, the conduction thermal equivalent circuit (or a thermal conduction equivalent circuit) may be represented by a temperature difference (T1-T2), thermal resistance Rcond, and thermal conductivity Q'cond between the respective elements.

Therefore, when the thermal resistance, the thermal conductivity, and T1 are input, T2 may be calculated. On the contrary, when the thermal resistance, the thermal conductivity, and T2 are input, T1 may be calculated.

Figure 4:
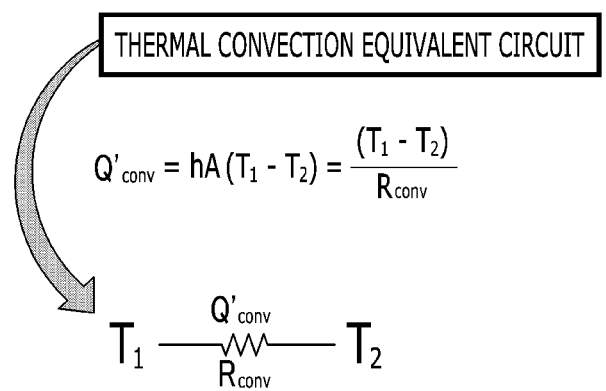
FIG. 4 is an equation illustrating a convection thermal equivalent circuit according to an exemplary embodiment of the present invention.

FIG. 4 is an equation illustrating a convection thermal equivalent circuit according to an exemplary embodiment of the present invention.

Referring to FIG. 4, the convection thermal equivalent circuit (or a thermal convection equivalent circuit) may be represented by a temperature difference (T1-T2), thermal resistance Rconv, and a thermal convection rate Q'conv between the respective elements.

Therefore, when the thermal resistance, the thermal convection rate, and T1 are input, T2 may be calculated. On the contrary, when the thermal resistance, the thermal convection rate, and T2 are input, T1 may be calculated.

FIG. 5 is a Table comparing a thermal system and an electric system according to an exemplary embodiment of the present invention.

Referring to FIG. 5, in the thermal system, a thermal equation is formed by a temperature difference ($\Delta T$), thermal conductivity (convection rate) (Q'), resistance (R), and thermal capacity (C), and in the electric system, a thermal equation is formed by voltage (V), current (I), resistance (R), and capacitance (C).

According to an embodiment of the present invention, it is possible to shorten the calculation time by analyzing the thermal system of the motor 112 on the same principle as the electric system, and it is possible to prevent thermal failure of the motor 112 in advance and improve durability thereof by deriving the temperature of each of the elements of the motor in almost real time.

Figure 6:
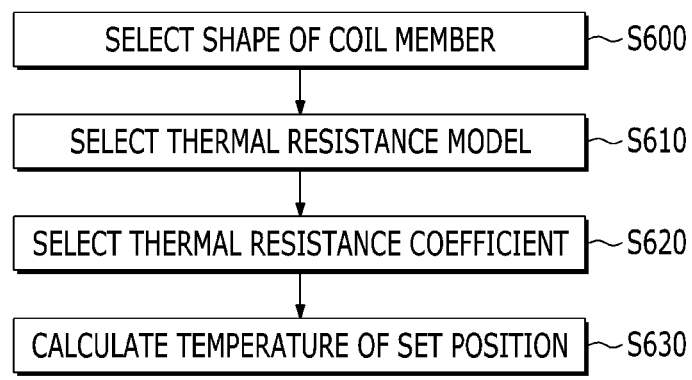
FIG. 6 is a flowchart illustrating a temperature calculation method of a motor using a thermal equivalent circuit according to an exemplary embodiment of the present invention.

FIG. 6 is a flowchart illustrating a temperature calculation method of a motor using a thermal equivalent circuit according to an exemplary embodiment of the present invention.

Referring to FIG. 6, the temperature calculation method includes selecting a shape of a coil member 730 (S600), selecting a thermal resistance model of the coil member 730 (S610), selecting a thermal resistance coefficient of the coil member 730 (S620), and calculating a temperature of a set position of the coil member 730 (S630)

The method of selecting the shape of the coil member 730 will be described with reference to FIG. 7, the method of selecting the thermal resistance model will be described with reference to FIG. 8A to 8C, and the method of selecting the thermal resistance coefficient and calculating the temperature will be described with reference to FIG. 9.

Figure 7:
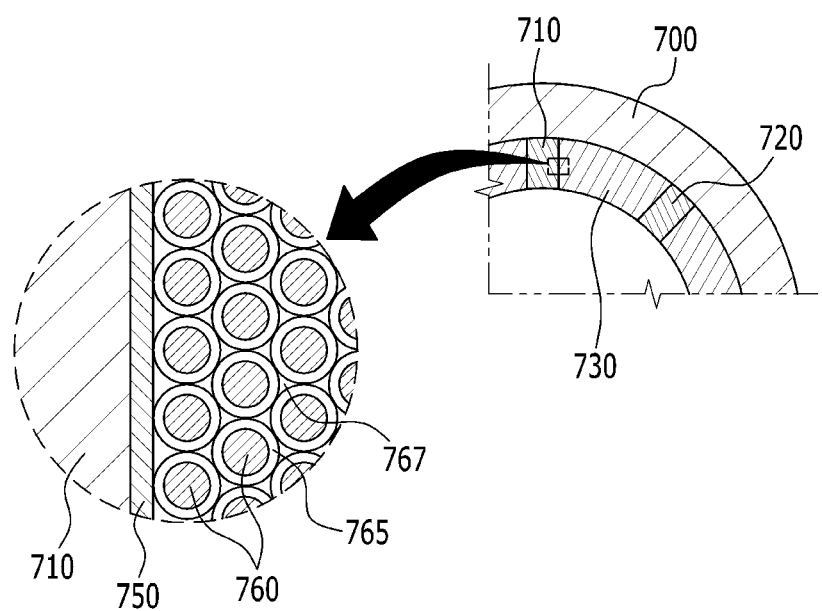
FIG. 7 is a partial cross-sectional view of a motor in a step of selecting a shape according to an exemplary embodiment of the present invention.

FIG. 7 is a partial cross-sectional view of a motor in the step of selecting a shape according to an exemplary embodiment of the present invention.

Referring to FIG. 7, the motor includes a yoke 700 fixed onto an inner circumference surface of a motor housing, first and second teeth 710 and 720 fixed onto an inner circumference surface of the yoke 700 and disposed while having an interval set in a circumference direction of the yoke, and a coil member 730 disposed between the first and second teeth 710 and 720.

Here, the yoke 700 and the first and second teeth 710 and 720 may be formed integrally, and may be separated in a thermal resistance model.

As shown, the coil member 730 corresponds to a form of slot formed between the first and second teeth 710 and 720 configuring the stator of the motor, the coil member 730 includes coils 760 wound around the slot, coating members 765 enclosing the coils 760, air gaps 767 formed between the coils 760 and the coating members 765, and an insulating paper 750 closely adhered to the first and second teeth 710 and 720, and the coils 760, the coating members 765, the air gaps 767, and the insulating paper 750 are equalized to one coil member 730.

Thus, the thermal equivalent circuit for each of the coils 760, the coating members 765, the air gaps 767, and the insulating paper 750 is not configured, and the thermal equivalent circuit for one coil member is configured.

Figure 8A:
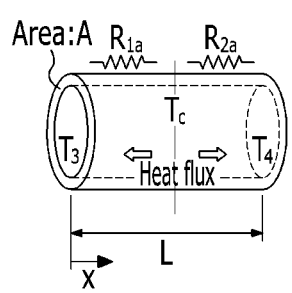
FIGS. 8A to 8C illustrate the respective models in a step of selecting a thermal resistance model according to an exemplary embodiment of the present invention.
Figure 8B:
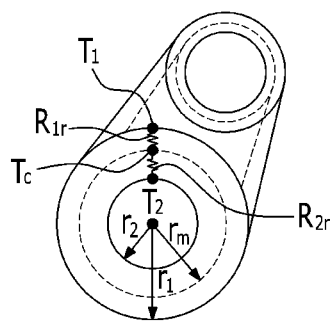
Figure 8C:
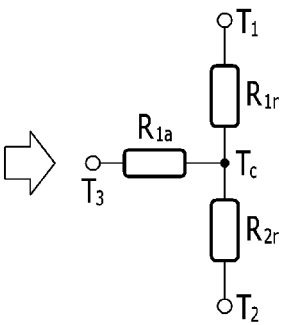

FIGS. 8A to 8C illustrate the respective models in the step of selecting a thermal resistance model according to an exemplary embodiment of the present invention.

Referring to FIG. 8A, an axial thermal resistance model may calculate an inner central portion temperature $T_c$ of a central portion in a length direction of the coil member 730 by using a structure having a pipe shape, and may calculate temperatures $T_3$ and $T_4$ of both end surfaces by using axial conduction resistances $R_{1a}$ and $R_{2a}$.

Further, referring to FIG. 8B, the axial thermal resistance model may calculate the inner central portion temperature $T_c$ of the central portion in the length direction of the coil member 730 by using the structure having a pipe shape, and may calculate an inner circumference surface temperature and an outer circumference surface temperature $T_1$ and $T_2$ by using radial conduction resistances $R_{1r}$ and $R_{2r}$.

That is, referring to FIG. 8C, the inner circumference surface temperature and the outer circumference surface temperature $T_1$ and $T_2$ and temperatures $T_3$ and $T_4$ of both end surfaces may be calculated by using the inner temperature $T_c$ of the coil member 730 of the set position and the thermal conduction resistances of the respective directions. Here, $R_{1r}$ represents radial outer thermal conduction resistance, $R_{2r}$ represents radial inner thermal conduction resistance, and $R_{1a}$ represents axial thermal conduction resistance.

Figure 9:
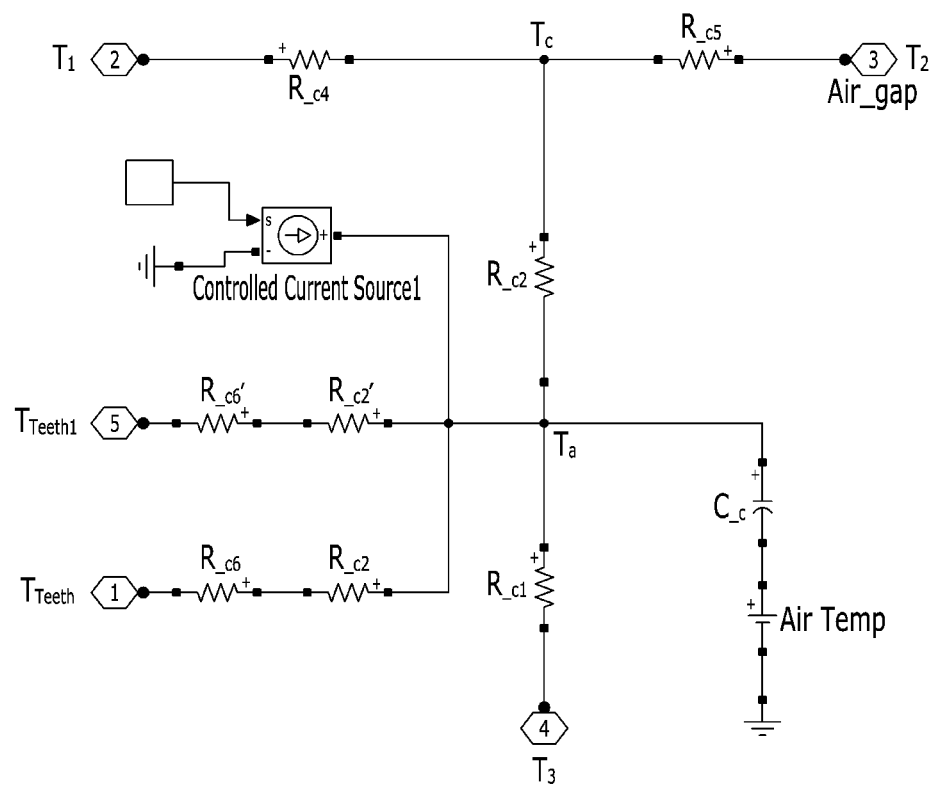
FIG. 9 is a detailed model of the temperature calculation system of the motor using the thermal equivalent circuit according to an exemplary embodiment of the present invention.

FIG. 9 is a detailed model of the temperature calculation system of the motor using the thermal equivalent circuit according to an exemplary embodiment of the present invention.

Referring to FIG. 9, a temperature Tc of an inner one side of the coil member 730 is calculated or selected, and the outer circumference surface temperature T1 and the inner circumference surface temperature T2 of the coil member 730 are calculated by each using radial conduction resistances $R_{c4}$ or $R_{c5}$.

In addition, an average temperature Ta of the coil member 730 is calculated or selected by using a preset compensation resistance $R_{c2}$, a heating amount (current source 1) generated from the coil member 730, and thermal capacity $C_c$ of the coil member 730.

If the average temperature of the coil member 730 is calculated, the temperature $T_3$ of the end surface of one side of the coil member is calculated or selected by using the axial conduction resistance, and a temperature $T_{Teeth1}$ of a first teeth side and a temperature $T_{Teeth2}$ of a second teeth side in the coil member 730 are calculated or selected by using conduction resistance $R_{c2'}$ or $R_{c2}$ of the coil member 730 and conduction resistance $R_{c6'}$ or $R_{c6}$ of the insulating paper 750 configuring the coil member 730.

According to the exemplary embodiment of the present invention, the calculated temperatures of the set position of the coil member 730 are used as data to calculate the temperature for the entire system of the motor, and when it is determined that the temperature of the set position of the coil member 730 is greater than a set value or is the set value or more, the controlling unit 100 may control the driving unit 110 of the motor to control the input power or the rotation speed input to the motor 112.

Further, when it is determined that the calculated temperature exceeds the set value, the controlling unit 100 may generate an overheat signal, and may control a display unit (not shown) displaying an overheated state so that a user may confirm the overheated state.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A temperature calculation system of a motor using a thermal equivalent circuit that includes a yoke disposed along an inner circumference of a motor housing, first and second teeth arranged on an inner circumference surface of the yoke while having an interval set in a circumference direction, and a coil member formed between the first and second teeth and including a plurality of coils, forms a thermal equivalent circuit of the coil member, and calculates a temperature of a set portion of the coil member, wherein:
   an outer circumference surface temperature and an inner circumference surface temperature of the coil member are calculated by using a radial conduction resistance using a temperature Tc of an inner one side of the coil member,
   an average temperature of the coil member is calculated by using a compensation resistance from the temperature of the inner one side of the coil member, a thermal capacity of the coil member, and a heating amount of the coils formed in the coil member, and
   a temperature of an end surface of the coil member is calculated by using an axial conduction resistance of the coil member in the average temperature.

2. The temperature calculation system of claim 1, wherein:
   the radial conduction resistance, the compensation resistance, the thermal capacity, the heating amount of the plurality of coils, and the axial conduction resistance are preset values.

3. The temperature calculation system of claim 1, wherein:
   the heating amount of the plurality of coils is calculated by power input to the motor.

4. The temperature calculation system of claim 1, wherein:
   when it is determined that the outer circumference surface temperature is a set value or more, the inner circumference surface temperature is a set value or more, the average temperature is a set value or more, and the temperature of the end surface is a set value or more, power input to the motor is adjusted to be decreased, or an emergency signal is generated.

5. The temperature calculation system of claim 1, wherein:
   the coil member includes a plurality of coils, and an insulating paper interposed between the coils and the first and second teeth.

6. The temperature calculation system of claim 5, wherein:
   the coil member includes coating members formed on outer circumference surfaces of the coils, and air gaps formed between the coils.

7. The temperature calculation system of claim 6, wherein:
   a temperature of a side of the first teeth in the coil member is calculated from the average temperature by using coil conduction resistances corresponding to the coils and insulating paper conduction resistance corresponding to the insulating paper.

8. The temperature calculation system of claim 7, wherein:
   the coil conduction resistances and the insulating paper conduction resistance are preset values.

9. A temperature calculation system of a motor comprising:
   a yoke fixed onto an inner circumference surface of a motor housing;
   a first teeth and a second teeth fixed onto an inner circumference surface of the yoke, the first teeth and the second teeth being separated by an interval set in a circumference direction of the yoke; and
   a coil member disposed between the first teeth and second teeth and comprising a plurality of coils, wherein the temperature calculation system is configured to
   use a thermal equivalent circuit that includes the yoke, the first teeth, the second teeth, the coil member, and the plurality of coils to
      form a thermal equivalent circuit for the coil member, and
      calculate a temperature of a set portion of the coil member,
   using a radial conduction resistance that uses a temperature of an inner one side of the coil member, calculate an outer circumference surface temperature and an inner circumference surface temperature of the coil member,
   using a compensation resistance from the temperature of the inner one side of the coil member, a thermal capacity of the coil member, and a heating amount of the coils formed in the coil member, calculate an average temperature of the coil member, and
   using an axial conduction resistance of the coil member in the average temperature of the coil member, calculate a temperature of an end surface of the coil member.

10. The temperature calculation system of claim 9, wherein the yoke, the first teeth, and the second teeth are formed integrally.

11. The temperature calculation system of claim 9, wherein:
    the radial conduction resistance, the compensation resistance, the thermal capacity, the heating amount of the plurality of coils, and the axial conduction resistance are preset values.

12. The temperature calculation system of claim 9, wherein:
    the heating amount of the plurality of coils is calculated by power input to the motor.

13. The temperature calculation system of claim 9, wherein:
    when it is determined that the outer circumference surface temperature is a set value or more, the inner circumference surface temperature is a set value or more, the average temperature is a set value or more, and the temperature of the end surface is a set value or more, power input to the motor is adjusted to be decreased, or an emergency signal is generated.

14. The temperature calculation system of claim 9, wherein the coil member corresponds to a form of a slot formed between the first teeth and the second teeth configuring a stator of the motor, wherein the plurality of coils are wound around the slot, wherein the coil member comprises coating members enclosing the plurality of coils, air gaps formed between the plurality of coils and the coating members, and an insulating paper closely adhered to the first and second teeth, and wherein the plurality of coils, the coating members, the air gaps, and the insulating paper are equalized to the coil member.

15. The temperature calculation system of claim 14, wherein the thermal equivalent circuit for the coil member is configured.

16. The temperature calculation system of claim 9, wherein:
the coil member includes an insulating paper interposed between the plurality of coils and the first and second teeth.

17. The temperature calculation system of claim 16, wherein:
the coil member includes coating members formed on outer circumference surfaces of the coils, and air gaps formed between the plurality of coils.

18. The temperature calculation system of claim 17, wherein:
a temperature of a side of the first teeth in the coil member is calculated from the average temperature by using coil conduction resistances corresponding to the coils and insulating paper conduction resistance corresponding to the insulating paper.

19. The temperature calculation system of claim 18, wherein:
the coil conduction resistances and the insulating paper conduction resistance are preset values.

20. A method for calculating a temperature of a motor comprising:
using a thermal equivalent circuit that includes a yoke, a first teeth, a second teeth, a coil member, and a plurality of coils, forming a thermal equivalent circuit for the coil member, and calculating a temperature of a set portion of the coil member, wherein the yoke is fixed onto an inner circumference surface of a motor housing, wherein the first teeth and the second teeth are fixed onto an inner circumference surface of the yoke, wherein the first teeth are separated from the second teeth by an interval set in a circumference direction of the yoke, and wherein the coil member is disposed between the first teeth and second teeth;

using a radial conduction resistance that uses a temperature of an inner one side of the coil member, calculating an outer circumference surface temperature and an inner circumference surface temperature of the coil member;

using a compensation resistance from the temperature of the inner one side of the coil member, a thermal capacity of the coil member, and a heating amount of the coils formed in the coil member, calculating an average temperature of the coil member; and using a axial conduction resistance of the coil member in the average temperature of the coil member, calculating a temperature of an end surface of the coil member.

* * * * *